UNITED STATES PATENT OFFICE.

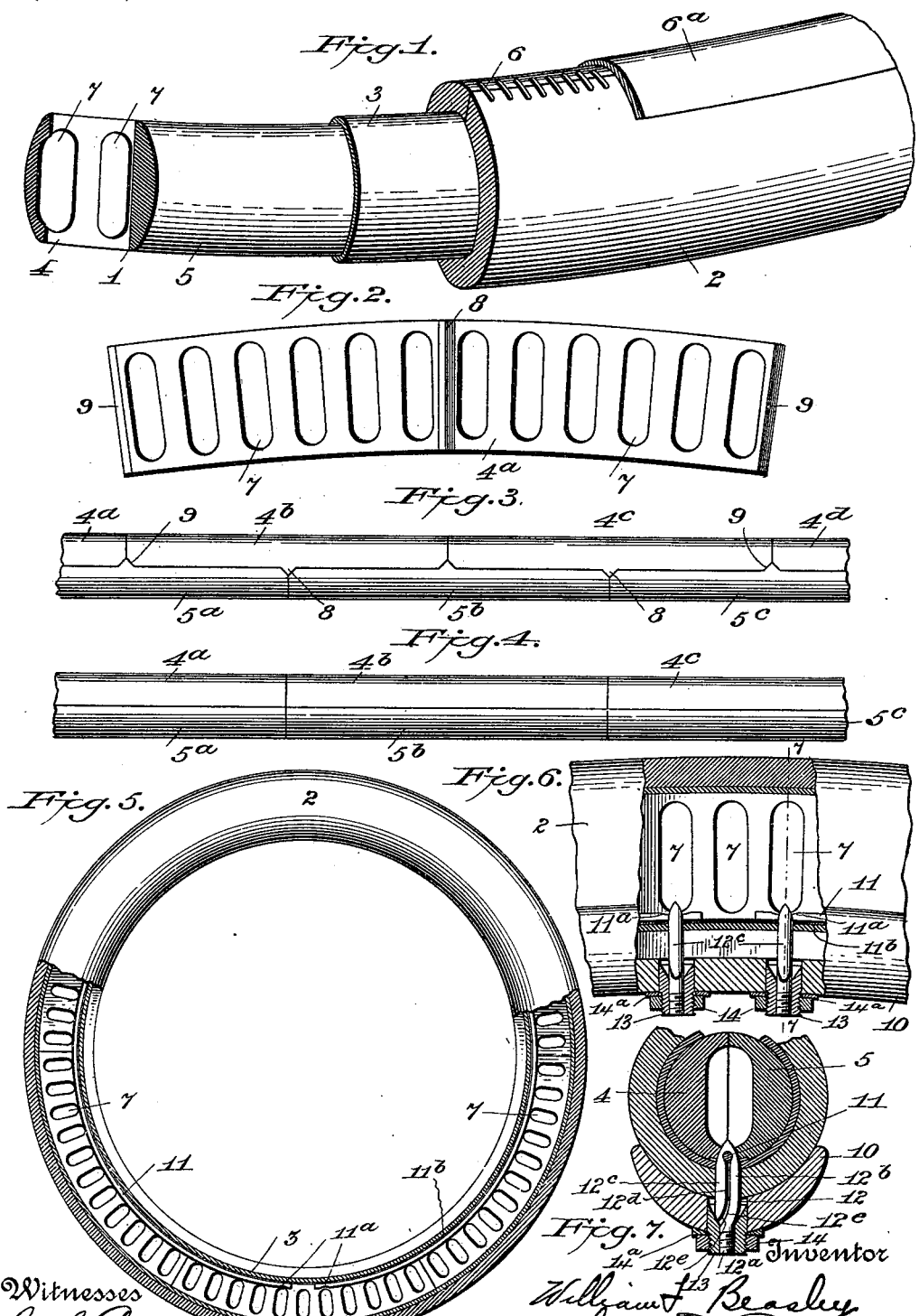

WILLIAM F. BEASLEY, OF PLYMOUTH, NORTH CAROLINA.

TIRE AND MEANS FOR SECURING SAME IN PLACE.

SPECIFICATION forming part of Letters Patent No. 672,119, dated April 16, 1901.

Application filed October 20, 1899. Serial No. 734,255. (No model.)

*To all whom it may concern:*

Be it known that I, WILLIAM F. BEASLEY, a citizen of the United States of America, and a resident of Plymouth, in the county of Washington and State of North Carolina, have invented certain new and useful Improvements in Tires and Means for Securing the Same in Place, of which the following is a specification.

My invention relates to the construction of resilient tires—that is to say, tires the elasticity of which is dependent upon the material of which they are composed—and to means especially applicable for securing such tires in place upon rims; and in many of its features it relates to improvements on the tires shown in the hereinafter-mentioned applications filed by me in the United States Patent Office, whereby the construction of tires is simplified and cheapened or whereby the resilient portions of such tires may be inserted in pneumatic or air-tube tires now in common use.

My invention consists in the construction, arrangement, and combination of the several parts of which it is composed, as will be hereinafter more fully described and claimed.

Referring to the accompanying drawings, in which corresponding parts are designated by similar marks of reference, Figure 1 is a perspective view of a part of a completed tire constructed in accordance with my present invention. Fig. 2 is a side elevation of one of the tire-sectors. Fig. 3 is an edge view of the resilient portion of a tire constructed of sectors such as shown in Fig. 2. Fig. 4 shows a modification of the construction shown in Fig. 3. Fig. 5 is a section of a completed tire, taken on the line of separation between the tire-sections, showing the band for securing a tire in place upon a rim. Fig. 6 is a fragmental side elevation, partly in section, of a tire, such as that shown in Fig. 5, as applied to a rim. Fig. 7 is a transverse section on line 7 7 of Fig. 6.

My present invention, as shown in Fig. 1, consists of a resilient portion 1, contained in an outer casing 2, the resilient portion being free to move within the casing, whereby when the latter strikes projections or obstructions in the roadway the resilient portion will assume that position therein in which the least strain is placed thereon. Heretofore resilient tires have been so constructed that the resilient portions have been caught and held against movement by such projections or obstructions and as a consequence have been unduly strained and placed under undue local compression, which has resulted in tearing or otherwise destroying the tire, which has only a limited amount of elasticity. It is obvious that in this respect a resilient section is different from a pneumatic section having thin walls, as the elasticity of the latter depends on air, a perfectly elastic fluid, and thus a pneumatic tire may be distorted or locally compressed to any extent occurring in practical use without breaking down its elasticity.

For the purpose of preserving the freedom of motion between the resilient section and the outer casing with a minimum of friction I coat the outer surface of the resilient portion and the inner surface of the casing with a suitable lubricating material, such as powdered soapstone, thus forming a layer of friction-reducing material; but I prefer to also use a sleeve 3, interposed between the resilient portion and the casing and composed of some fabric which will not adhere to or bite or catch in the two portions 1 and 2 of the tire, this also forming a layer of friction-reducing material which is free to move in respect to both the casing and the resilient sections. The sleeve 3, in addition to its function in permitting the desired freedom of motion of the resilient portion in respect to the casing, lends itself in other respects to use with my preferred form of a resilient portion, which by preference is composed of two half-sections 4 5 of some approved construction—such, for instance, as the cellular sections shown in an application filed by me in the United States Patent Office on the 24th day of June, 1899, and serially numbered 721,771—each section having a flat abutting face located in the plane of revolution of the tire. The sleeve 3 is placed around these sections and serves as a holder therefor while being placed in the casing. The casing for this purpose may have its rim-face slitted to a greater or less extent to permit the resilient portion to be drawn therein in the manner now common in the assembling of pneumatic double-tube tires, or the whole of the rim-face of the tire may be slitted to permit the resilient portion being placed therein. In either case I prefer to secure the edges of the slit in the casing together by a lacing 6, and as the outer casing will, if the abutting faces of the resilient sections are not secured to each other, be required to be of considerable strength to hold the abutting faces together in the manner described in my said application I prefer to reinforce such lacing by a tie-strip 6ª laid over the lacing and cemented or vulcanized to the outer casing on the opposite edges of the slit or slits therein. By this construction it will be seen that pneumatic-tube tires now in use may be readily converted into resilient tires by merely inserting a resilient portion therein.

Instead of making the resilient tire-sections 4 5 in completely annular form, I may make them of a plurality of similar and interchangeable sectors 4ª 4ᵇ 4ᶜ 4ᵈ 5ª 5ᵇ 5ᶜ, &c., as is shown in another application filed by me in the United States Patent Office on the 10th day of April, 1899, and serially numbered 712,522. One of these sectors is shown in Fig. 2. It is obvious that these sectors may be made by molding in the manner described in another application filed by me in the United States Patent Office on the 23d day of February, 1899, and serially numbered 706,482, which on the 17th day of October, 1899, was patented as Patent No. 634,866, and that as described therein in connection with tire-sections each composed of single piece two opposite sectors 4ª 5ª 4ᵇ 5ᵇ, &c., may have their abutting faces joined by vulcanization while still in the molds in which they were formed; but for the purposes of this application I prefer to leave the abutting faces of the two sections unconnected. The sections, as shown, have recesses 7 in their abutting faces, as described in my said applications, Serial Nos. 706,482 and 721,771.

In assembling a tire having two resilient sections each composed of a plurality of sectors it is obvious that the sectors in one section may be so disposed as to break joint with the sectors in the other section, as is shown in Fig. 3, or to have their joints coincident, as shown in Fig. 4. In the former construction I prefer to interlock the sectors together to prevent relative movement by forming a projection 8 in the middle of the abutting face of each sector, which projection takes into the recess formed by the registering beveled corners 9 of the two sectors breaking joint therewith, as is shown in Fig. 3.

By making the tire of the preferred construction above described it will be seen that any tire-sector which may have become worn or broken may be readily replaced by a new sector without necessitating the replacement of the whole of the resilient portion of the tire or the whole of a section thereof.

A convenient device for holding a resilient tire, preferably but not necessarily of the character hereinbefore described, upon a rim is shown in Figs. 5, 6, and 7, in which 10 designates the rim. A wire or other suitable metallic band 11 is laid within the casing of the tire and preferably between the abutting faces of the two sections 4 5 thereof, the band being non-adherent to the tire, so as to permit the stretching of the latter when being placed upon the rim, the ends of the band while being brought into proximity to each other not being connected. Each end of the band is engaged by a pin-hook 12, passing through holes formed in the rim. The form of hook employed may be that shown in the drawings, which consists of a threaded body portion 12ª, from which projects a shank 12ᵇ, having a pointed head and a hook portion 12ᶜ substantially parallel to the shank and separated therefrom by the open slot 12ᵈ, the end of the hook portion being beveled, as at 12ᵉ. Such a pin-hook may be inserted through the material at the rim-face of the tire far enough to catch the band 11 in the open end of the slot 12ᵈ, the recesses 7 in the resilient sections of the tire when they are presented facilitating the insertion of the pin-hook for this purpose. The pin-hook is then partly withdrawn, whereby the band will be brought up into the closed end of the slot, as shown. A collar 13, having a flared end, is then screwed onto the threaded base of the pin-hook, the flared end of the collar as the latter is screwed home bearing on the beveled end 12ᵉ of the hook portion and compressing it against the shank portion. It is obvious that, if desired, the flared end of the collar and the beveled end of the hook may be threaded, whereby the latter will be engaged and more strongly held by the former. A nut 14 is then screwed over the cylindrical base of the collar 13, the exterior of which is threaded and worked home against a suitable washer 14ª, interposed between it and the inner surface of the rim, thus holding the tire firmly in the groove in the latter. In order to prevent the ends of the band from pulling through the slots in the pin-hooks, I by preference reduce the sectional area of the band near its ends at the points where it is to be engaged by the pin-hooks, as shown at 11ª. It is obvious that pin-hooks such as have been described may be located at any desired number of points around the wheel for the purpose of engaging the band; but as such supplemental hooks will engage portions of the band intermediate of its ends there will generally be no necessity of reducing the cross-section of the band at such points.

It is obvious that the band 11 may consist of a single continuous piece or of a plurality of sectors, composing a completed band, each sector being secured in the manner before described, and that, if desired, the casing may be strengthened against being cut by the band by interposing between the parts a metallic tape 11ᵇ or other suitable cushion.

Having thus described my invention, what

I claim, and desire to secure by Letters Patent, is—

1. In a tire, the combination with a resilient portion composed of a plurality of separate sections, of a sleeve covering the said sections, an outer tubular casing slitted to permit the introduction of the resilient sections therein, and means for holding the edges of the slitted casing together to support the resilient sections against separation, the sleeve being located between the casing and the resilient portion and permitting the movement of the said parts in relation to each other, substantially as described.

2. In a tire, the combination with a resilient portion composed of a plurality of separate sections divided in the plane of revolution of the tire, of an outer tubular casing, slitted to permit the introduction of the resilient sections therein, and means for holding the edges of the slitted casing together to support the resilient sections against separation, substantially as described.

3. In a tire, the combination with a resilient portion composed of a plurality of separate sections, divided in the plane of revolution of the tire, of a sleeve covering the said sections, an outer tubular casing, slitted to permit the introduction of the resilient sections and sleeve therein, and means for holding the edges of the slitted casing together to support the resilient sections against separation, substantially as described.

4. In a tire, the combination with an outer casing, of a resilient portion contained therein and composed of sections divided in the plane of revolution of the tire, each section consisting of a plurality of separate similar and interchangeable sectors, substantially as described.

5. In a tire, the combination with an outer casing, of a resilient portion contained therein and composed of sections divided in the plane of revolution of the tire, each section consisting of a plurality of separate similar and interchangeable sectors, and means for interlocking the said sectors, substantially as described.

6. In a tire, the combination with an outer casing, of a resilient portion contained therein and composed of sections divided in the plane of revolution of the tire, each section consisting of a plurality of separate similar and interchangeable sectors, and a sleeve interposed between the resilient portion and the outer casing, substantially as described.

7. The combination with a rim and tire, the tire having recesses therein to afford resiliency, of a metallic band contained within the tire, hooks, adapted to be inserted in the tire and into the recesses therein to engage the band, and means for securing the hooks to the rim, substantially as described.

8. The combination with a tire comprising an outer casing and a resilient cellular portion contained therein consisting of two sections divided in the plane of revolution of the tire, of a band contained within the outer casing and between the base of the two resilient sections, and hooks adapted to be inserted between the resilient sections and to engage the band, substantially as described.

9. The combination with a rim and tire, the tire having recesses therein to afford resiliency, of a metallic band contained in the tire and upon which the tire can be moved, slotted hooks adapted to be inserted in the tire to engage the band and means for securing the hooks to the rim, substantially as described.

10. The combination in a tire-securer, of a hook having a body portion and a hook portion separated by a slot, and a collar threaded upon the body portion and when worked home bearing upon the hook portion, substantially as described.

Signed by me at Washington, District of Columbia, this 12th day of October, 1899.

WILLIAM F. BEASLEY.

Witnesses:
ROBINSON WHITE,
VERNON M. DORSEY.